United States Patent Office 2,859,539
Patented Nov. 11, 1958

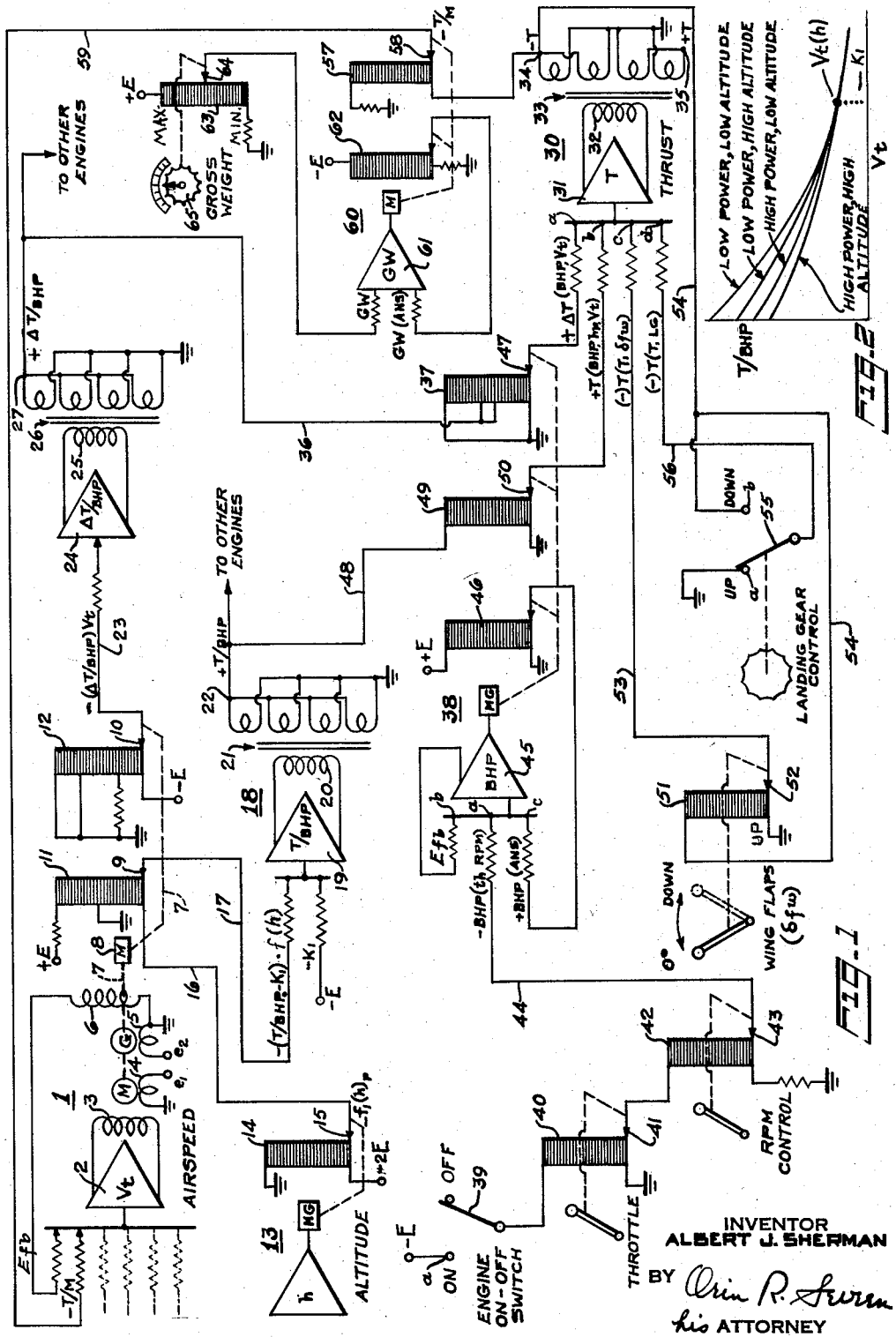

2,859,539

SIMULATED AIRCRAFT THRUST COMPUTING SYSTEM

Albert J. Sherman, New York, N. Y., assignor to Curtiss-Wright Corporation, a corporation of Delaware Application June 14, 1954, Serial No. 436,546

8 Claims. (Cl. 35—12)

This invention relates to ground-based training apparatus for aircraft personnel, and in particular to electrical computing apparatus that is responsive to various simulated flight, aircraft and engine conditions for representing propeller thrust which in turn is a major factor in determining the air speed of the simulated flight.

For a given propeller, there are various optimum combinations of (1) horsepower absorbed by the propeller, (2) air speed, and (3) air density (which varies with altitude), for obtaining maximum propeller efficiency. In general, most propellers operate near their maximum efficiencies at moderately high air speeds for wide ranges of horsepower and altitude. Other factors being equal, propeller efficiency tends to drop from the maximum as the air speed is reduced to the low range of speed. In this range of speed, the efficiency further tends to drop if the air density is decreased, or the horsepower to be absorbed by the propeller is increased.

Inasmuch as the range of low speed generally includes conditions such as take-off, landing, climb and long range cruising, a thrust simulating system that represents merely an average of conditions cannot provide satisfactory and realistic computed results in the case of both climb performance and cruise performance for example.

A principal object of the present invention therefor is to provide an improved thrust computing system in ground-based aircraft training apparatus that realistically takes into account basic flight and engine operating conditions.

In accordance with the present invention, the thrust computing system includes a plurality of inter-related electrical systems for computing the loss in propeller efficiency incident to low air speeds and accompanying reduction in air density and/or increase in brake horsepower at the propeller shaft.

The invention will be more fully set forth in the following description referring to the accompanying drawing, and the features of novelty will be pointed out with particularity in the claims annexed to and forming a part of this specification.

Referring to the drawing, Fig. 1 is a partly diagrammatic and schematic illustration of a simulated propeller thrust computing system embodying the present invention; and Fig. 2 is a graphical illustration of propeller performance under varying engine power and altitude conditions.

Before describing the electrical computing system of Fig. 1, certain basic relations will be considered. The thrust horsepower (THP) which is the power actually delivered by the propeller is expressed by the following equation:

$$THP = K \cdot T \cdot V_t$$

where K represents a constant, T the propeller thrust and $V_t$ the true air speed of the simulated flight.

By definition, propeller efficiency ($P_{eff}$) is output divided by input which may be expressed as follows:

$$P_{eff} = \frac{THP}{BHP} = \frac{KTV_t}{BHP}$$

or $$\frac{T}{BHP} = \frac{P_{eff}}{KV_t}$$

where BHP is brake horsepower.

Thus it will be seen that if propeller efficiency is assumed to be constant, the graphical relationship of $T/BHP$ to $V_t$ is a hyperbola. Obviously, this theoretical condition cannot obtain in practice and since, as above pointed out, propeller efficiency varies under different power and altitude conditions, representative actual conditions correspond generally to the curves of Fig. 2.

For the purposes of the present invention the equation for computing propeller thrust may be expressed as follows:

$$T = (\{[T/BHP_0 - K_1] \cdot f(h) + K_1\}BHP + [\Delta T/BHP \cdot f(BHP)]BHP) \cdot f(S_{fw}) \cdot f(lg)$$

where $T/BHP_0 - K_1 = f(V_t)$, $f(h) = f(\rho, V_t)$ and $\Delta T/BHP = f(V_t)$ also, the factor $T/BHP_0$ represents a reference variation of thrust—brake horsepower ratio as a function of air speed, $K_1$ is a useful constant, $h$ represents altitude, $S_{fw}$ represents wing flaps deflection, $\rho$ is air density and $f(lg)$ represents a function of landing gear position. The factor $f(BHP)$ is determined from analysis of data, as are also the wing flaps and landing gear factors which represent the effect of interference of wing flaps and landing gear on net thrust. The factor $f(BHP)$ represents the variation in thrust-brake horsepower ratio increment, $\Delta T/BHP$, as the horsepower to the propeller varies from the reference condition.

Referring specifically to Fig. 1, there is schematically illustrated an electrical system including electronically controlled servo apparatus embodying the present invention for computing simulated net propeller thrust. The system shown is of the alternating current (A. C.) type although it will be understood that direct current systems may be used where desired; also it will be understood that electrical servo systems other than the motor type shown may be used where suitable for corresponding computations.

The electrical servo system for computing true air speed ($V_t$) is indicated at 1 and comprises a summing amplifier 2, the input of which is connected to a network as indicated for feeding a plurality of A. C. signals from the main flight computing system to the amplifier. The summed or resultant signal representing the linear acceleration, $\dot{V}_t$ is operated on by the amplifier and energizes the control coil 3 of a two phase A. C. motor M, the other coil 4 of which is energized by a reference A. C. voltage $e_1$. The motor is connected to a two phase feedback generator G having one coil 5 energized by a reference voltage $e_2$ and the generating coil 6 connected as indicated to the amplifier input network for feeding a velocity voltage $E_{fb}$ thereto. The motor through a mechanical connection and reduction gearing generally indicated at 7 and 8 respectively positions the brush or slider contacts 9 and 10 of the air speed servo function potentiometers 11 and 12 respectively for deriving at said contacts voltages representing functions of air speed and other factors. The above description of the air speed servo system will be sufficient for this application as the other servos are generally similar and therefore can be shown diagrammatically. The operation of this type of servo motor is well-known, the rotation being in one direction when the control and reference voltages in the respective phases have the same instantaneous polarity, and in the opposite direction when the instantaneous polarity of the control voltage is reversed with respect to the reference voltage, the rate of rotation in both cases depending on the magnitude of the summed input signals.

The various potentiometers, such as the air speed potentiometers 11 and 12, comprise individual resistance elements that may be of the well-known wound card type of circular or band form, diagrammatically illustrated herein by a plane development for clearness. Each potentiometer is shaped or contoured so that the value of the derived voltage at the potentiometer contact or slider bears a certain relationship to the linear movement of the slider contact depending on the particular function of the potentiometer, and has a voltage impressed across its terminals depending in instantaneous polarity and magnitude on some multiplying function. Accordingly, the brush voltage of all servo potentiometers represents a function of the variable represented alone or modified by some multiplying function.

The input circuits for the air speed servo 1 are omitted in the interest of simplicity, an example of such circuits being disclosed in Patent No. 2,731,737 granted January 24, 1956 to Robert G. Stern.

The air speed potentiometers or cards 11 and 12 are used to derive function voltages for the computing system in the following manner: the card 11 is grounded at a mid-portion and energized at its upper terminal by a voltage $+E$ and at its lower terminal by a function voltage from the altitude ($h$) servo system 13. This system may be energized in turn from the main flight computing system as disclosed for example in the aforesaid Patent No. 2,731,737. The $h$ servo card 14 is grounded at its upper terminal and is energized at its lower terminal by a voltage $-2E$ and the derived voltage at slider 15 is fed by lead 16 to the card 11. Accordingly, the derived voltage at slider 9 of $V_t$ card 11 which combines functions of air speed and altitude may represent that part of the above thrust equation identified as $(T/BHP_0-K_1) \cdot f(h)$. That is, referring to Fig. 2, it will be seen that the thrust delivered by a propeller as affected by altitude may be represented by a family of curves ($T/BHP$ versus $V_t$ for different altitudes) that intersect at a certain value of $V_t$ which may conveniently be designated $V_{t(h)}$. This value corresponds to the intermediate ground tap position on the potentiometer 11. Below this value of $V_{t(h)}$ altitude affects $T/BHP_0$ (the reference variation of $T/BHP$); however if $V_t$ is greater than $V_{t(h)}$ the ratio $T/BHP_0$ is not affected by altitude. The ordinate of the value $V_{t(h)}$ may be expressed as constant $K_1$ which is useful for simplifying the simulation. Since, as previously pointed out, the ratio $T/BHP$ at a given altitude may be expressed as a function of $V_t$, the voltages derived at slider 9 of potentiometer 11 correspond, in relation to the slider position, to the aforesaid curves thereby satisfying the relationship $$(T/BHP_0-K_1 \cdot f(h)$$

This derived voltage is fed by lead 17 through suitable proportioning resistance as indicated to the input network of the $T/BHP$ electrical system 18 which comprises a summing amplifier 19, the output of which energizes the primary winding 20 of a transformer 21. Another voltage input $-E$ represents the constant $K_1$. Accordingly, the transformer secondary winding produces a voltage representing $T/BHP$ at terminal 22 that is corrected for altitude but uncorrected for propeller shaft horsepower and is used as a computing factor for one or more simulated engines in a manner hereinafter described.

The $V_t$ card 12 is energized at its lower terminal by the constant voltage $-E$ and is suitably designed as indicated for derivation of a function voltage at the slider 10 representing that part of the thrust equation identified as $\Delta T/BHP$. In other words, the card 12 is designed to match the characteristic curve $\Delta T/BHP$ vs. $V_t$. This curve starting with maximum value $\Delta T/BHP$ drops off rapidly (according to the requirement of matching propeller thrust data) with increase in $V_t$ from zero up to a moderate value of $V_t$, then tapers off, finally to intercept the $V_t$ axis at a high but less than maximum value of $V_t$. Thus the card will be designed for the function from zero $V_t$ to the tapering off point beyond which the different slope of the curve will be simulated by a resistance-shunted portion of the card. At a still higher value of $V_t$ short of maximum the card is grounded to represent the point of intersection. Accordingly the voltage derived from card 12 follows the aforesaid characteristic curve. This voltage is fed by conductor 23 to an amplifier 24 representing the aforesaid increment factor and the output of this amplifier energizes the primary winding 25 of a transformer 26 which produces at a secondary terminal 27 a function voltage corresponding to the aforesaid increment factor. This voltage is also used as a computing factor for one or more simulated engines in a manner hereinafter described.

The electrical system for computing net thrust (T) is generally indicated at 30 and comprises a summing amplifier 31 that is connected as indicated to an input network for the various input signals representing thrust components or factors. The amplifier output is connected to the primary winding 32 of a transformer 33, the secondary terminals 34 and 35 of which produce computing voltages $-T$ and $+T$ for use as hereinafter indicated.

Referring to the input network of the thrust system, the signal at input terminal $a$ is obtained from the increment factor transformer 26, terminal 27, from which it is fed by lead 36 to a card 37 of the brake horsepower (BHP) servo system generally indicated at 38. The BHP system is illustrated for purposes of simplicity in rudimentary manner wherein the main input signal at its input terminal $a$ originates at a simulated engine "on-off" switch 39, the "$a$" contact of which is connected to a source of constant voltage $-E$. The switch 39 is connected to a card 40, the slider 41 of which is adjustable by a simulated throttle as indicated. A card 42 the slider 43 of which is adjustable by a simulated R. P. M. or governor control is in turn energized by a derived throttle voltage at slider 41 and the combined voltage at slider 43 is fed by lead 44 to the input terminal $a$ of the BHP servo amplifier 45. The BHP inputs also include a feedback voltage at terminal $b$ and answer voltage at terminal $c$ from the BHP answer card 46. For a more complete disclosure of the BHP computing system, reference is made to application S. N. 436,328, filed on even date herewith (now Patent No. 2,824,388) by R. G. Stern, W. H. Dawson and C. H. Havill for "Training Apparatus For Representing Aircraft Engine Operation" and assigned to the same assignee as the present invention.

Referring back to the BHP function card 37 which is energized by the aforesaid increment factor voltage, the derived voltage at its slider 47 may be considered to represent that part of the aforesaid thrust equation including the product of the above increment factor and $f(BHP)BHP$. This voltage is fed to the thrust amplifier input terminal $a$.

The input signal at the thrust amplifier terminal $b$ is produced at the $T/BHP$ transformer 21, terminal 22, and is fed by conductor 48 through the BHP card 49, slider 50, to input terminal $b$. This composite signal therefore represents the product of BHP and the combined factor represented by the output of the $T/BHP$ transformer 21, i. e. that portion of the equation to which is added the increment factor, etc.

The remaining thrust amplifier inputs at terminals $c$ and $d$ concern the wing flaps and landing gear respectively and represent the factors tending to interfere with the development of optimum thrust. The wing flap signal is derived at card 51 in accordance with adjustment of slider 52 by the wing flaps control as indicated. When the flaps are represented as in the normal or zero degree position, the slider 52 is at ground potential and no signal is fed by the connecting lead 53 to the input terminal $c$. When, however, the flaps are represented as "down" or in an intermediate position a signal is derived from the card (which is energized from the thrust transformer 33, terminal 34, lead 54, by a voltage −E) that satisfies the aforesaid thrust equation as regards the interference effect of wing flaps on thrust.

The landing gear signal for input terminal $d$ is derived in generally the same manner except that there is no simulated intermediate position of the landing gear and accordingly a switch 55 operable by the simulated landing gear control may be used in place of the potentiometer card. When the landing gear is "up" the switch 55 grounds the connecting lead 56 to the input terminal $d$ through the switch "$a$" contact so that no signal is present. When the landing gear is "down" the switch engages its "$b$" contact (connected to lead 54) for applying a signal representing T to the thrust amplifier input. This signal represents the multiplication factor for satisfying the aforesaid thrust equation as regards the interference effect of landing gear (when lowered) on thrust.

It will therefore be seen that the resultant of the respective signals fed to the thrust amplifier input network represents net thrust as called for by the aforesaid thrust equation. The voltage output therefore of the thrust transformer 33 can be used as thrust signals for other computing operation. For example, one method of using the thrust signal is shown in connection with the computation of air speed. Since the effect of thrust on air speed depends upon the mass of the airplane, the thrust signal from transformer terminal 34 is first modified by a reciprocal function card 57 of a system representing gross weight (GW) or mass (M) of the airplane. The card 57 is energized at its lower terminal by the voltage −T and is grounded through a resistance at its upper terminal so that the derived voltage at slider 58 represents −T/M. This voltage is in turn fed by lead 59 to the input network of the air speed amplifier 2. Thus, acceleration forces are taken into account in computing air speed in accordance with simulated variation in gross weight of the airplane. The gross weight system may assume any suitable form, such as a servo motor system 60 comprising a servo amplifier 61 answer card 62 and an input network for the answer signal and a gross weight signal derived from card 63, the slider 64 of which is adjustable as indicated by the instructor's gross weight dial 65.

As previously indicated, the present invention is readily applicable to the simulation of multi-engine aircraft as the signals from the T/BHP transformer 21 and the increment factor transformer 26 may be used with duplicate equipment for computing thrust for each engine-propeller combination.

For purposes of clarification, the various A. C. signal voltages indicated in the drawing are specially identified both as to voltage polarity or phase sense and as to the usual sense of the factor or quantity itself. For example, when the signal voltage corresponds in phase to the reference voltage, the signal is indicated thus, +E or (+)E; and when the signal is of opposite phase it is indicated −E or (−)E. If the quantity itself is negative in its own sense, the algebraic sign is enclosed within parentheses to so indicate; thus (+)E designates a negative quantity that is represented by an in-phase signal. Also (−)E designates a negative quantity that is represented by an out-of-phase signal and conversely, both +E and −E without parentheses designate positive quantities.

It should be understood that this invention is not limited to specific details of construction and arrangement thereof herein illustrated, and that changes and modifications may occur to one skilled in the art without departing from the spirit of the invention.

What is claimed is:

1. In ground-based training apparatus for aircraft personnel, electrical computing means operable according to simulated flight and engine conditions including an individual electrical computing system for representing simulated net thrust of an engine-propeller combination, a second individual electrical system for computing airspeed and having means for deriving control quantities representing a thrust-brake horsepower ratio as functions of airspeed, and a third individual electrical system for computing brake horsepower and having means for deriving control quantities according to functions of brake horsepower, said thrust computing system being responsive to the combined control quantities aforesaid and adapted to produce a control quantity representing a function of thrust for controlling said airspeed computing system.

2. In ground-based training apparatus having electrical computing means as set forth in claim 1, in which the brake horsepower system modifies the control quantities produced by the air speed system and the thrust system is responsive to the modified control quantities.

3. In ground-based training apparatus having electrical computing means as set forth in claim 1, in which means representing the altitude of the simulated flight is operatively connected to one of the air speed system deriving means for modifying the corresponding control quantity according to a function of altitude, said modified control quantity being further modified by the brake horsepower system for controlling the thrust system.

4. In ground-based training apparatus having electrical computing means as set forth in claim 1, wherein one of the function-of-airspeed control quantities represents thrust-brake horsepower ratio and a constant, an electrical computing system representing the thrust-brake horsepower ratio responsive to the aforesaid control quantity for in turn producing a control quantity representing said ratio, said ratio quantity being in turn modified by one of said brake horsepower deriving means for input to said thrust system.

5. In ground-based training apparatus having electrical computing means as set forth in claim 1, in which additional means are energized in accordance with said thrust function control quantity and are adjustable respectively according to simulated wing flaps deflection and position of landing gear for deriving additional control quantities for said thrust system for representing thrust interference effects.

6. In ground-based training apparatus having electrical computing means as set forth in claim 1, in which means adjustable according to simulated gross weight of the airplane is adapted to modify said thrust function control quantity for in turn controlling the airspeed system.

7. In ground based training apparatus having electrical computing means as set forth in claim 1, in which the air speed system has a first and second voltage deriving means for deriving voltages representing functions of airspeed, means for deriving a voltage representing a function of altitude for energizing the said first air speed deriving means whereby the derived voltage therefrom represents functions of airspeed and altitude, means jointly responsive to the aforesaid voltage and to a voltage representing a constant for producing in turn a voltage representing thrust-brake horsepower ratio, the brake horsepower system having voltage deriving means energized by said ratio voltage for producing a thrust function input voltage for the thrust system, said second air speed voltage deriving means producing an airspeed function voltage, and said brake horsepower system having additional voltage deriving means energized by said air speed function voltage for producing an increment thrust function input voltage for said thrust system, said thrust system being responsive to the resultant of said thrust and increment voltages for representing propeller thrust.

8. In ground-based training apparatus for aircraft personnel, an electrical computing system operable according to simulated flight and engine conditions to compute simulated net thrust (T) of an engine-propeller combination according to the equation:

$$T = \{[T/BHP_0 - K_1] \cdot f(h) + K_1\}BHP + [\Delta T/BHP \cdot f(BHP)]BHP \cdot f(S_{fw}) \cdot f(lg)$$

wherein $T/BHP_0$ represents a reference variation of thrust-brake horsepower ratio as a function of air speed, $K_1$ is a useful constant, $h$ is altitude, BHP is brake horsepower, $\Delta T/BHP$ is thrust-brake horsepower ratio increment, $S_{fw}$ is wing flaps deflection and $lg$ is landing gear position; comprising a servo system operable according to simulated airspeed and having a plurality of voltage deriving means, one of said deriving means being energized according to simulated altitude for deriving a voltage representing $(T/BHP_0 - K_1) \cdot f(h)$ as functions of air speed and altitude, means for summing said voltage and a constant voltage representing $(K_1)$, a second servo system operable according to simulated brake horsepower and having a plurality of voltage deriving means, one of said last-mentioned deriving means being energized by the above summed voltages for deriving a voltage representing the main thrust factor of the aforesaid equation, electrical thrust computing means responsive to said main thrust voltage, another of said airspeed deriving means adapted to derive an increment voltage representing $\Delta T/BHP$ as a function of air speed, another of said brake horsepower deriving means being energized by said increment voltage for deriving a voltage representing the thrust increment $$[\Delta T/BHP \cdot f(BHP)]$$

BHP of the aforesaid equation, said thrust computing means also being responsive to said increment voltage, and means operable according to simulated flaps and landing gear positions for deriving voltages representing $f(S_{fw})$ and $f(lg)$ respectively also for input to said thrust computing means, the voltage output of said computing means representing net thrust and constituting feedback to the input of said airspeed servo system and to said flaps and landing gear deriving means.

References Cited in the file of this patent
UNITED STATES PATENTS

| | | |
|---|---|---|
| 2,554,155 | Rippere | May 22, 1951 |
| 2,584,261 | Davis et al. | Feb. 5, 1952 |